United States Patent [19]
Thomas

[11] Patent Number: 5,537,890
[45] Date of Patent: Jul. 23, 1996

[54] MOTOR VEHICLE STEERING COLUMN

[75] Inventor: Steven M. Thomas, Saginaw, Mich.

[73] Assignee: General Motors Corporation, Detroit, Mich.

[21] Appl. No.: 442,615

[22] Filed: May 17, 1995

[51] Int. Cl.$^6$ .................................................. B02D 1/18
[52] U.S. Cl. .......................... 74/493; 280/775; 403/109; 403/377
[58] Field of Search .............................. 74/493; 280/775; 403/104, 109, 377, 379

[56] References Cited

U.S. PATENT DOCUMENTS

| | | | |
|---|---|---|---|
| 4,539,861 | 9/1985 | Nishikawa | 74/493 |
| 4,541,299 | 9/1985 | Kanaya et al. | 74/493 |
| 4,709,592 | 12/1987 | Anderson | 74/493 |
| 4,774,851 | 10/1988 | Iwanami et al. | 74/493 |
| 5,009,120 | 4/1991 | Iseler et al. | 74/493 |

*Primary Examiner*—Allan D. Herrmann
*Assistant Examiner*—Troy Grabow
*Attorney, Agent, or Firm*—Saul Schwartz

[57] ABSTRACT

A motor vehicle steering column including a stationary support, a moveable support on which a steering wheel is rotatably mounted, and a position control apparatus which achieves both positive retention of the position of the moveable support and substantially infinite positional adjustability. The position control apparatus includes a gate on the stationary support, a stack of thin plates on the moveable support which moves back and forth with the moveable support in front of the gate, and a slide on the stationary support which moves a segment of the stack of thin plates partially into the gate to immobilize the moveable support relative to the stationary support. In a preferred embodiment, a spring strokes the slide to a position partially overlapping the stock of thin plates and the gate when an operating lever is pivoted from an unlocked position to a locked position and a cam rotatable with the operating lever strokes the slide in the opposite direction when the operating lever is pivoted form the locked position to the unlocked position.

3 Claims, 3 Drawing Sheets

MOTOR VEHICLE STEERING COLUMN

FIELD OF THE INVENTION

This invention relates to adjustable motor vehicle steering columns.

BACKGROUND OF THE INVENTION

Motor vehicle steering columns in which the position of a steering wheel is adjustable in the direction of a longitudinal centerline of the steering column usually include a stationary support, a moveable support on which the steering wheel is rotatably mounted, and a position control apparatus to capture the position of the moveable support relative to the stationary support. Prior position control apparatuses having included a simple friction clamp between the stationary and moveable supports and clamps having interengaging spline teeth for enhanced resistance to relative movement between the stationary and moveable supports.

SUMMARY OF THE INVENTION

This invention is a new and improved adjustable motor vehicle steering column including a stationary support, a moveable support on which a steering wheel is rotatably mounted, and a position control apparatus which achieves both positive retention of the position of the moveable support and substantially infinite positional adjustability. The position control apparatus includes a gate on the stationary support, a stack of thin plates on the moveable support which moves back and forth with the moveable support in front of the gate, and a slide on the stationary support which moves a segment of the stack of thin plates partially into the gate to immobilize the moveable support relative to the stationary support. In a preferred embodiment, a spring strokes the slide to a position where the corresponding segment of the stack of thin plates partially overlaps the stack of thin plates and the gate when an operating lever is pivoted from an unlocked position to a locked position and a cam rotatable with the operating lever strokes the slide in the opposite direction when the operating lever is pivoted from the locked position to the unlocked position.

DESCRIPTION OF A PREFERRED EMBODIMENT

Figure 1:
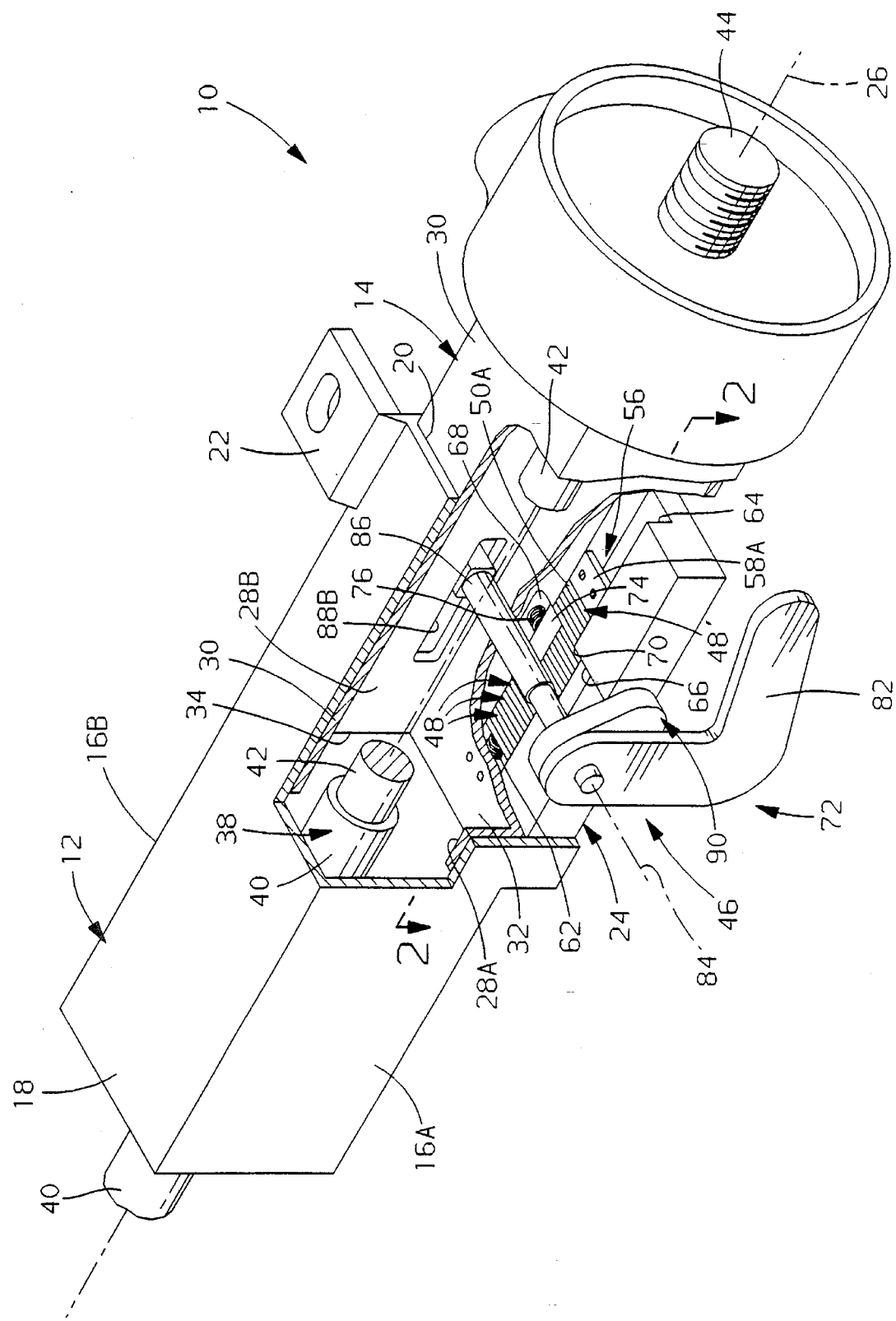
FIG. 1 is a fragmentary, partially broken-away perspective view of an adjustable motor vehicle steering column according to this invention.

An adjustable motor vehicle steering column 10 according to this invention includes a stationary support 12 and a moveable support 14. The stationary support 12 includes a pair of parallel sidewalls 16A–B, a top wall 18 between the sidewalls, and an outboard end 20. The stationary support 12 is attached to a vehicle body, not shown, near the outboard end 20 through a bracket 22 on the stationary support. A flat block 24 is rigidly attached to the stationary support 12 between the sidewalls 16A–B and cooperates with the latter and with the top wall 18 in defining a box-shaped journal whereby the moveable support 14 is mounted on the stationary support for in and out sliding movement in the direction of a longitudinal centerline 26 of the steering column.

The moveable support 14 is telescoped inside of the stationary support 12 and includes a pair of sidewalls 28A–B, a top wall 30, a bottom wall 32, an open inboard end 34, and an outboard end 36. A fragmentarily illustrated steering shaft 38, FIG. 1, has a lower part 40 mounted on the stationary support 12 for rotation about the centerline 26 and an upper part 42 mounted on the moveable support 14 for rotation about the centerline 26 and for bodily movement with the moveable support in the direction of centerline 26. The upper part 42 is telescoped inside the lower part 40 for accommodating in and out movement of the moveable support 14 relative to the stationary support 12. A steering wheel, not shown, is rigidly attached to an end 44 of the upper part 42 of the steering shaft. The position of the steering wheel relative to an operator seated in a passenger compartment, not shown, of the vehicle is adjusted by moving the steering wheel and the moveable support 14 in and out in the direction of the longitudinal centerline 26 relative to the stationary support.

A position control apparatus 46 of the steering column 10 includes a stack of thin, rectangular plates 48. As typically illustrated at 48', each of the thin plates 48 has a pair of long sides 50A–B, a pair of short sides 52A–B and a centrally located elongated slot 54 parallel to the long sides 50A–B. A rack 56 of the position control apparatus 46 consists of a pair of angle brackets 58A–B on opposite sides of the stack of thin plates 48 rigidly attached to the bottom wall 32 of the moveable support 14 from below the bottom wall, a rod 60 between the brackets 58A–B passing through the slots 54 in the thin plates 48, and a spring 62 pressing the stack of thin plates against the bracket 58A. The rack 56 connects the stack of plates 48 to the moveable support 14 for movement therewith in the direction of the centerline 26. The slots 54 in the thin plates 48 accommodate bodily movement of each of the plates relative to the other plates and to the moveable support perpendicular to the centerline 26.

Figure 4:
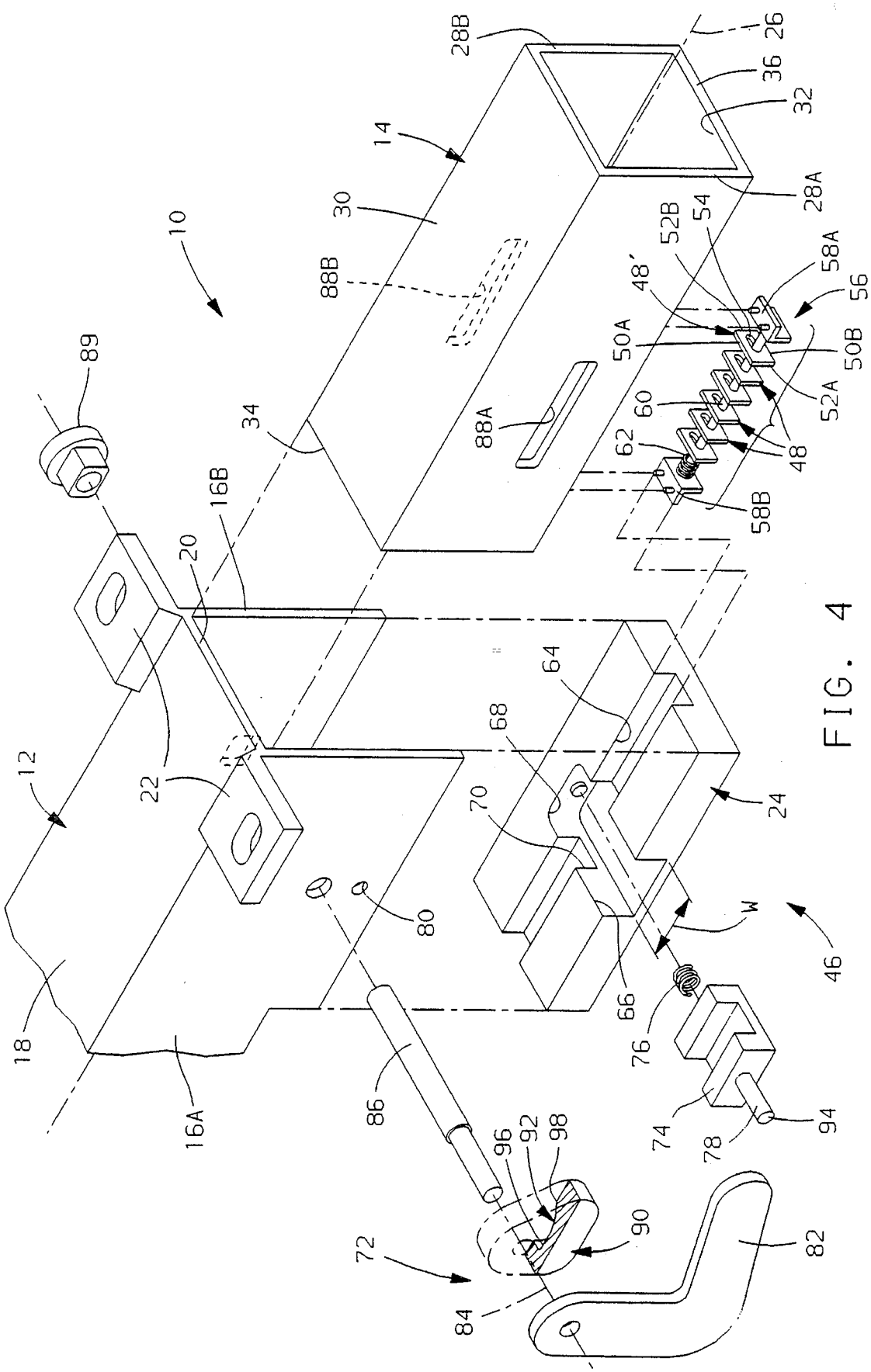
FIG. 4 is an exploded perspective view of the adjustable motor vehicle steering column according to this invention.

The flat block 24 on the stationary support 12 has a longitudinal groove 64 therein. A width dimension of the groove 64 corresponds to the length of the long sides 50A–B of the thin plates 48 and a depth dimension of the groove 64 corresponds to the length of the short sides 52A–B of the thin plates so that when the moveable support 14 is telescoped inside the stationary support, the stack of thin plates 48 slides back and forth in the groove 64, a lateral groove 66 in the flat block 24 intersects the longitudinal groove 64 perpendicular to the centerline 26. On one side of the longitudinal groove 64, the lateral groove defines a spring chamber 68. On the other side of the longitudinal groove 64, the lateral groove defines a gate 70 having a width dimension "W", FIG. 4, parallel to the longitudinal centerline 26.

Figure 2:
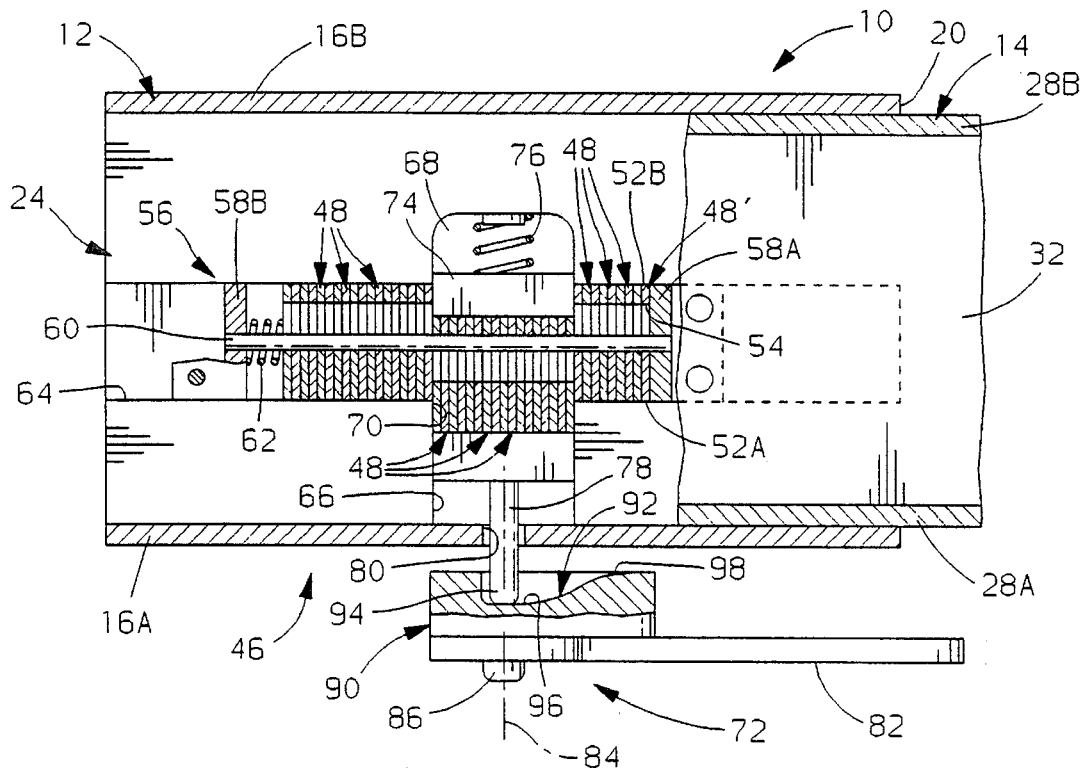
FIG. 2 is a fragmentary view taken generally along the plane indicated by lines 2—2 in FIG. 1.
Figure 3:
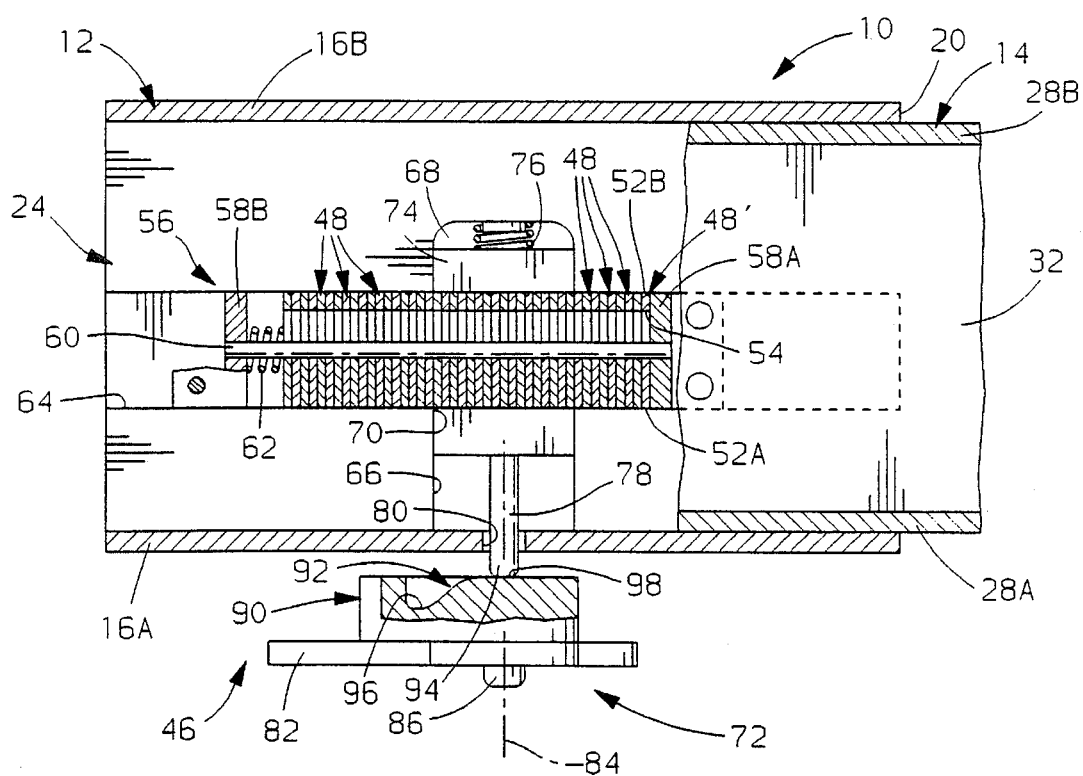
FIG. 3 is similar to FIG. 2 showing elements of the adjustable motor vehicle steering column according to this invention in different relative positions.

An actuator 72 of the position control apparatus 46 includes a U-shaped slide 74 closely received in the lateral groove 66 facing the stack of thin plates 48, a spring 76 in the spring chamber 68, and a control rod 78 attached to the slide and projecting out of the steering column through an aperture 80 in the sidewall 16A of the stationary support. The slide 74 is slidable back and forth in the lateral groove 66 between a retracted position, FIG. 3, aligned with the longitudinal groove 64 and an extended position, FIGS. 1–2, overlapping the longitudinal groove and the gate 70. The spring 76 urges the slide toward its extended position.

An operating lever 82 of the actuator 72 is mounted on the stationary support 12 for rotation about a lateral centerline 84 thereof by a shaft 86 which projects through a pair of slots 88A–B in the sidewalls 28A–B of the moveable support 14 to accommodate movement of the latter. A nut 89 is nonrotatably mounted on the sidewall 16B and receives a threaded end of the shaft 86. A cam 90 is attached to the operating lever 82 for rotation as a unit therewith about the lateral centerline 84. The cam 90 has a cam groove 92 facing the sidewall 16A in which an outboard end 94 of the control rod 78 seats. In a locked position of the operating lever 82, FIGS. 1–2, the outboard end 94 of the control rod is seated in a deep end 96 of the cam groove. In an unlocked position of the operating lever 82, FIG. 3, the outward end 94 of the control rod is seated in a shallow end 98 of the cam groove.

When adjustment of the position of the steering wheel is desired, the operating lever 82 is pivoted to its unlocked position. As the outboard end 94 of the control rod 78 traverses the cam groove 92 from the deep end 96 to the shallow end 98, the cam groove strokes the slide 74 against the spring 76 from its extended position to its retracted position in the longitudinal groove 64. The stack of thin plates 48 is, then, shiftable with the moveable support 14 back and forth in front of the gate 70 through the center of the slide 74.

When a comfortable position of the steering wheel is achieved, the operating lever 82 is pivoted from its unlocked position to its locked position. Rotation of the shaft 86 relative to the nut 89 causes the sidewalls 16A–B to be squeezed against the sidewalls 28A–B whereby lash between the stationary support 12 and the moveable support 14 is eliminated. Concurrently, or as the outboard end 94 of the control rod 78 traverses the cam groove 92 from the shallow end 98 to the deep end 96 thereof, the spring 76 strokes the slide 74 from its retracted position to its extended position. The slide 74 transports a segment of the stack of thin plates 48 corresponding to the width dimension "W" of the gate 70 to a position overlapping the gate and the longitudinal grove 64. In the event that the slide is blocked by a thin plate overhanging an edge of the slide, the outboard end 94 of the control rod separates from the cam groove 92. Thereafter, when the overhang is eliminated by only very slight longitudinal movement of the moveable support 14, the spring 76 automatically strokes the slide 74 to its extended position.

In the extended position of the slide 74, the segment of the stack of thin plates overlapping the gate 70 and the longitudinal groove 64 constitutes a lock bolt 100 on the moveable support 14 captured between opposite sides of the gate 70. Force on the steering wheel urging foreshortening of the steering column and penetration of the moveable support 14 into the stationary support 12 is transferred to the lock bolt through the bracket 58A and the ones of the thin plates 48 between the bracket 58A and the lock bolt. The width dimension "W" of the gate 70 is calculated to render the segment of the stack of thin plates 48 constituting the lock bolt 100 sufficiently robust to positively resist, without distortion, a maximum anticipated impact load on the steering wheel.

The position of the moveable support 14 relative to the stationary support 12 is adjustable in increments equal to the thickness of each of the thin plates, which thickness is very small relative to the longitudinal overlap between the gate 70 and the stack of thin plates. Because such increments of adjustment are virtually imperceptible, an operator grasping the steering wheel and moving it in and out in the direction of the longitudinal centerline 26 of the steering column perceives substantially infinite positional adjustability of the steering column.

I claim:

1. A motor vehicle steering column including a stationary support, a moveable support mounted on said stationary support for back and forth bodily movement in the direction of a longitudinal centerline of said steering column, and a position control apparatus for capturing the position of said moveable support relative to said stationary support, characterized in that said position control apparatus comprises:

a gate on said stationary support, a plurality of thin plates supported in a stack on said moveable support for bodily movement as a unit therewith in the direction of said longitudinal centerline of said steering column in front of said gate and for bodily movement relative to said moveable support perpendicular to said longitudinal centerline of said steering column, and means on said stationary support operative to move a segment of said stack of said thin plates aligned with said gate perpendicular to said longitudinal centerline of said steering column to a position partially overlapping said stack of thin plates and said gate so that said segment defines a lock bolt on said moveable support immobilizing said moveable support relative to said stationary support.

2. The motor vehicle steering column recited in claim 1 wherein said means on said stationary support operative to move said segment of said stack of said thin plates to said position partially overlapping said stack of thin plates and said gate comprises:

a U-shaped slide mounted on said stationary support for bodily movement perpendicular to said longitudinal centerline of said steering column from a retracted position permitting bodily movement of said stack of thin plates in the direction of said longitudinal centerline of said steering column through the center of said slide to an extended position overlapping said stack of thin plates and said gate, and actuator means on said stationary support operative to move said slide between said extended and said retracted positions thereof.

3. The motor vehicle steering column recited in claim 2 wherein said actuator means comprises:

an operating lever mounted on said stationary support for pivotal movement about a lateral centerline of said stationary support between a locked position and an unlocked position, a cam on said operating lever having a cam groove with a deep end and a shallow end, a control rod on said slide having an outboard end seated in said cam groove at said deep end thereof when said operating lever is in said locked position and at said shallow end thereof when said operating lever is in said unlocked position whereby said slide is stroked between said extended and said retracted positions when said operating lever is pivoted between said locked and said unlocked positions, and a spring biasing said slide toward said extended position.

\* \* \* \* \*